US012456857B2

(12) United States Patent
Khamesra et al.

(10) Patent No.: US 12,456,857 B2
(45) Date of Patent: Oct. 28, 2025

(54) POWER CONVERTER CURRENT SENSE FAULT DETECTION

(71) Applicant: Cypress Semiconductor Corporation, San Jose, CA (US)

(72) Inventors: Arun Khamesra, Bangalore (IN); Hariom Rai, Bangalore (IN); Pulkit Shah, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 165 days.

(21) Appl. No.: 18/333,373

(22) Filed: Jun. 12, 2023

(65) Prior Publication Data

US 2024/0280645 A1 Aug. 22, 2024

Related U.S. Application Data

(60) Provisional application No. 63/447,129, filed on Feb. 21, 2023.

(51) Int. Cl.
*H02H 7/12* (2006.01)
*H02H 7/125* (2006.01)
*H02M 1/00* (2006.01)
*H02M 3/335* (2006.01)

(52) U.S. Cl.
CPC ........ *H02H 7/1255* (2013.01); *H02M 1/0006* (2021.05); *H02M 3/33576* (2013.01)

(58) Field of Classification Search
CPC .................. H02H 7/1255; H02M 3/33576
See application file for complete search history.

(56) References Cited

U.S. PATENT DOCUMENTS

| | | | |
|---|---|---|---|
| 2009/0322484 A1* | 12/2009 | Toriyama ........... | G06K 19/0723 235/487 |
| 2015/0168476 A1* | 6/2015 | Park ................... | H03K 17/0822 324/549 |
| 2017/0338746 A1* | 11/2017 | Chen ................. | H02M 3/33592 |
| 2018/0367045 A1* | 12/2018 | Zhang ............... | H02M 3/33523 |
| 2021/0058000 A1* | 2/2021 | Ahmed ..................... | H02J 7/00 |

FOREIGN PATENT DOCUMENTS

CN 109742956 A * 5/2019

* cited by examiner

*Primary Examiner* — Harry R Behm

(57) ABSTRACT

One or more computing devices, systems, and/or methods are provided. In an example of the techniques presented herein, a method of operating a Universal Serial Bus Power Delivery (USB-PD) power converter is provided. The method includes generating a pulse width modulated (PWM) signal for controlling the power converter. An output current signal for the power converter is determined. The output current signal corresponds to an output current across an external sense resistor coupled in an output path of the USB-PD power converter. A fault condition is identified based on the PWM signal and the output current signal. Operation of the power converter is disabled responsive to identifying the fault condition.

20 Claims, 4 Drawing Sheets

POWER CONVERTER CURRENT SENSE FAULT DETECTION

PRIORITY

This application claims the priority and benefit of U.S. Provisional Application No. 63/447,129, filed on Feb. 21, 2023, the entire content of which is incorporated by reference herein.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. Alternating current to direct current (AC-DC) converters convert power from an alternating current (AC) source to a direct current (DC) source at a specified voltage level.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a secondary-side controller for a Universal Serial Bus Power Delivery (USB-PD) power converter comprises a driver configured to control a power-switch on a primary side of the USB-PD power converter based on a pulse width modulated (PWM) signal, a current sense amplifier configured to generate an output current signal corresponding to an output current provided by the power converter across an external sense resistor, and a controller configured to identify a fault condition based on the PWM signal and the output current signal.

In an embodiment of the techniques presented herein, the secondary-side controller comprises an analog-to-digital converter coupled to the current sense amplifier to generate a current code representative of the output current signal, wherein the controller is configured to identify the fault condition based on the PWM signal and the current code.

In an embodiment of the techniques presented herein, a Universal Serial Bus Power Delivery (USB-PD) system comprises a transformer including a primary side coupled to receive a rectified alternating current (AC) input voltage, and a secondary side connected to an output port to provide a direct current (DC) output voltage thereto, a primary-side controller coupled to a power switch to control operation of the transformer, a sense resistor coupled between the secondary side of the transformer and the output port, and a secondary-side controller coupled to the output port, the secondary-side controller including a driver configured to provide a pulse width modulated (PWM) signal to cause the primary-side controller to turn on and off the power switch, an analog-to-digital converter connected to receive an output current signal and generate an output current code based on the output current signal, wherein the output current signal corresponds to an output current across the sense resistor, and a controller configured to identify a fault condition based on the PWM signal and the output current code.

In an embodiment of the techniques presented herein, a system for operating a Universal Serial Bus Power Delivery (USB-PD) power converter comprises means for generating a pulse width modulated (PWM) signal for controlling the power converter, means for determining an output current signal for the power converter, wherein the output current signal corresponds to an output current across an external sense resistor coupled in an output path of the USB-PD power converter, means for identifying a fault condition based on the PWM signal and the output current signal, and means for disabling operation of the power converter responsive to identifying the fault condition.

In an embodiment of the techniques presented herein, a method of operating a Universal Serial Bus Power Delivery (USB-PD) power converter comprises generating a pulse width modulated (PWM) signal for controlling the power converter, determining an output current signal for the power converter, wherein the output current signal corresponds to an output current across an external sense resistor coupled in an output path of the USB-PD power converter, identifying a fault condition based on the PWM signal and the output current signal, and disabling operation of the power converter responsive to identifying the fault condition.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
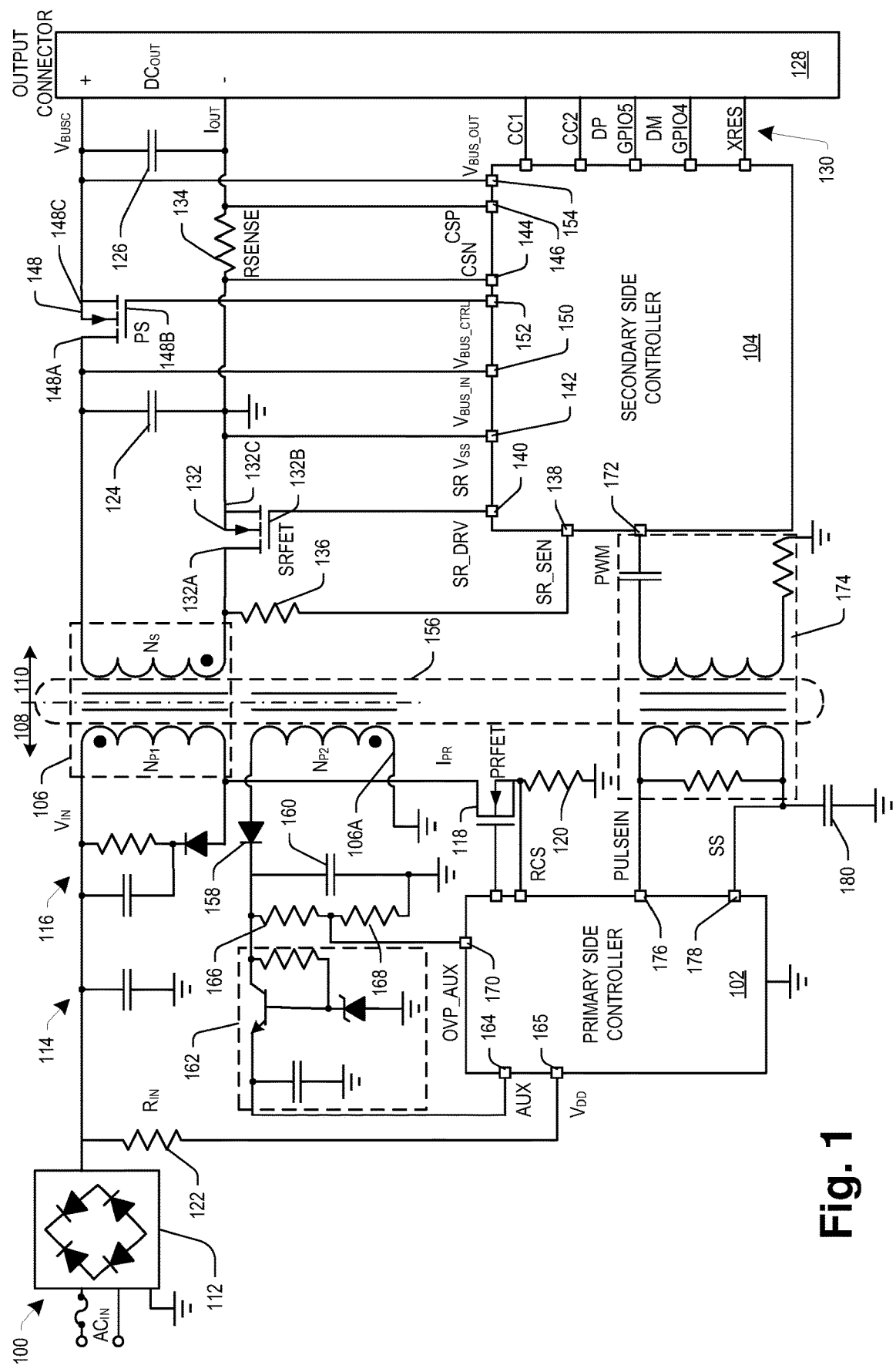
FIG. 1 is a schematic block diagram of a power converter, according to some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

Power converters meet safety requirements for equipment powered using industrial power supplies by limiting current and power during the various operating circumstances of the power converter, which include normal conditions, load-transient conditions, and severe output-fault conditions. For example, for a limited power source (LPS) power source up to 30V output, the power converter should limit output current to a maximum of 8 A. Example LPS standards are specified in the IEC 60950-1 standard.

A power converter may operate in a constant voltage mode where the power converter maintains the output voltage. If load demand increases, the load current is increased to maintain the output voltage. When a current limit is reached, the power converter may transition to a constant current mode, where the current is not allowed to exceed the current limit. In a constant current mode output voltage may drop in response to an increase in load demand but the output current does not exceed the limit. In some embodiments, power converters detect the load current and transition operating modes to limit the output power by sensing the output current using a sense resistor, RSENSE, in the output path. The output current may trigger over-current-protection (OCP) and/or short-circuit-protection (SCP) faults during an output-fault/short condition. However, the sense resistor is susceptible to manufacturing defects, shorts, or in-operation malfunction or damage which could potentially result in the incorrect sensing of the output current and, as a result, the power converter may not effectively limit the output current/power to meet safety requirements. For example, if the RSENSE resistor is damaged and the measured current is lower than the actual current, the power converter may increase the duty cycle of the power converter to maintain the output voltage without sensing that the output current has exceeded the limit.

Described herein are various embodiments of techniques for sense resistor short detection in a Discontinuous-Conduction-Mode (DCM), secondary-side controlled AC-DC converter. For example, the AC-DC converter can include a transformer to step down an input AC voltage from a primary side into an output DC voltage on a secondary side of the AC-DC converter. The output DC voltage can be supplied to a USB Type-C connector for use in charging USB compatible devices, for example. In some embodiments, the transformer can include an auxiliary winding that generates a reflected voltage to the primary side in order to supply voltage to the primary side after startup of the AC-DC converter. In some embodiments, the auxiliary winding also reflects the scaled output voltage of the secondary winding of the transformer to the primary side, e.g., by being designed similar to the secondary winding but being positioned on the primary side.

FIG. 1 is a schematic block diagram of a power converter 100, according to some embodiments. In some embodiments, the power converter 100 is an AC-DC power converter operating in DCM. The power converter 100 comprises a primary-side controller 102 and a secondary-side controller 104 for controlling a flyback transformer 106 having a first winding ($N_{P1}$) on a primary side 108 electrically connected or connected to an AC input ($AC_{IN}$), and a secondary winding ($N_S$) on a secondary side 110 connected to a DC output ($DC_{OUT}$). The AC input is connected to a first terminal of the flyback transformer 106 through a bridge rectifier 112, one or more input filters 114, and a snubber 116. In some embodiments, the AC input is a sinusoidal signal having an amplitude of between about 85V and 285V. A power switch 118, such as a primary field effect transistor (PRFET), has a first or drain node connected to a second terminal of the flyback transformer 106, a gate node connected to the primary-side controller 102, and a third or source node connected to the primary-side controller 102 through a current sensing element, such as a resistive element 120 (RCS) connected to ground to sense a primary side current ($I_{PR}$) flowing through the primary winding when the power switch 118 is closed or conducting. In some embodiments, the primary-side controller 102 is further connected to the first terminal of the flyback transformer 106 through a resistive element ($R_{IN}$) 122 to receive a voltage, $V_{DD}$, or signal equal or proportional to the rectified AC input voltage.

On the secondary side 110, the power converter 100 includes a filter capacitor 124 connected between a third terminal of the flyback transformer 106 and an electrical ground or ground terminal, and an output capacitor 126 connected between the third terminal and electrical ground provide a DC output voltage to an output interface, such as an output connector 128. In some embodiments, the capacitance of the filter capacitor 124 is between about 500 and 1000 uF, such as about 680 uF. Generally, as in the embodiment shown, the output connector 128 is further connected to the secondary-side controller 104 through a number of communication channels 130 to support various charging protocols. Suitable output connectors 128 can include those compatible with and supporting standard and proprietary charging protocols including Universal Serial Bus Power Delivery USB PD2.0 and USB PD3 with Programmable Power Supply (PPS), Qualcomm® Quick Charge, Samsung@ AFC, and Apple@ charging protocols. For example, the output connector 128 can include a Universal Serial Bus C (USB-C) compatible connector where the power converter 100 is compliant with the USB protocol to provide a DC output voltage of about 3.3 VDC to about 21.5 VDC (or higher, in case of Extended Power Range, EPR) at a current of up to substantially 5 amps (A).

In some embodiments, the power converter 100 includes, on the secondary side 110, a synchronous rectifier (SR) field effect transistor 132 (SRFET) connected between the flyback transformer 106 and through a current sense resistor 134 (RSENSE) to a negative terminal of the DC output. The SRFET 132 includes a drain node 132A connected to the fourth terminal of the flyback transformer 106, and through a resistor 136, to an SR sense pin (SR_SEN 138) of the secondary-side controller 104 to sense a voltage on the drain node 132A of the SRFET 132, a gate node 132B connected to an SR gate drive pin (SR_DRV 140) of the secondary-side controller 104 to drive or control the SRFET 132, and a source node 132C connected to the negative DC output and to the secondary-side controller 104 through a SR-Vss ground voltage level pin (SR-Vss) 142. A first node of the RSENSE resistor 134 is connected to a current sensing negative pin (CSN) 144 of the secondary-side controller 104, and a second node connected to the negative terminal of the DC output and to a current sensing positive pin (CSP) 146, to enable the secondary-side controller 104 to sense the output current, $I_{OUT}$, from the power converter 100. In some embodiments, the resistance of the RSENSE resistor 134 is between about 3 and 10 Mohm, such as 5 Mohm.

Optionally, as in the embodiment shown, the secondary side 110 includes an additional or secondary provider switch (PS) 148, such as a NFET, connected between the flyback transformer 106 and a positive terminal of the DC output to enable to the secondary-side controller 104 to turn off the DC output to protect against over voltage and/or under voltage conditions. The secondary provider switch 148 includes a source node 148A connected to a voltage_bus_in pin ($V_{BUS\_IN}$) 150 of the secondary-side controller 104, a gate node 148B connected to a voltage bus control pin ($V_{BUS\_CTRL}$) 152 to drive or control the secondary switch 148, and a drain node 148C connected to a voltage bus out pin ($V_{BUS\_OUT}$) 154 and to the positive terminal of the DC output.

As shown in FIG. 1, the power converter 100 includes an isolation circuit or barrier 156 to electrically isolate the secondary side 110 from the high AC input voltage present on the primary side 108. Because the flyback transformer 106 is a step down transformer, the flyback transformer 106 is considered part of the isolation barrier 156. In the example embodiment of FIG. 1, the isolation barrier 156 also includes an auxiliary coil of the flyback transformer 106, which functions as a flyback step-down transformer 106A to provide power to primary-side controller 102. The flyback step-down transformer 106A along with a diode 158 followed by a capacitor 160 to ground stores the stepped-down-voltage which is then clipped by a bipolar junction transistor (BJT) structure 162 and then connected to an AUX pin 164 of the primary-side controller 102. This additional circuit helps to reduce total power consumption of the power converter 100 by supplying the primary-side controller 102 through the AUX pin 164 instead of by a separate power supply, $V_{DD}$, connected on the primary side 108 of the flyback transformer 106 through the $R_{IN}$ resistive element 122 at a $V_{DD}$ pin 165. A resistor divider including resistive elements 166, 168 connected to an over voltage protection (OVP_AUX) pin 170 of the primary-side controller 102 is used to sense a reflected voltage of $V_{BUS\_IN}$ (i.e., the secondary side input voltage) on the secondary side 110 via the flyback step-down transformer 106A to disable the power switch 118 if an over voltage condition is detected.

Additionally where, as in the example embodiment of FIG. 1, the power converter 100 uses a pulse width modulation (PWM) signal provided to primary-side controller 102 from a PWM drive pin 172 on the secondary-side controller 104, the isolation barrier 156 can further include a pulse transformer 174 connected between the PWM drive pin and a PULSEIN pin 176 and a soft-start (SS) pin 178 of the primary-side controller 102. The SS pin may be connected to ground through a capacitor 180. The secondary-side controller 104 controls a width of the PWM signal based on power required on the DC output, which turns on the power switch 118 to start a switching cycle to optimize or increase efficiency of the power converter 100.

In some embodiments, the power converter 100 is configured for DCM operation. In DCM, during each switching cycle, the current in the primary winding ($N_{P1}$) of the flyback transformer 106 decreases to zero before the secondary side 110 is turned on and the magnetic flux built up in the transformer core causes current to flow through the secondary winding ($N_S$) of the flyback transformer 106. When the current flowing through the secondary winding ($N_S$) of the flyback transformer 106 decreases to zero, the secondary-side controller 104 signals the primary-side controller 102 (e.g., through the pulse transformer 174) to start a new switching cycle.

Figure 2:
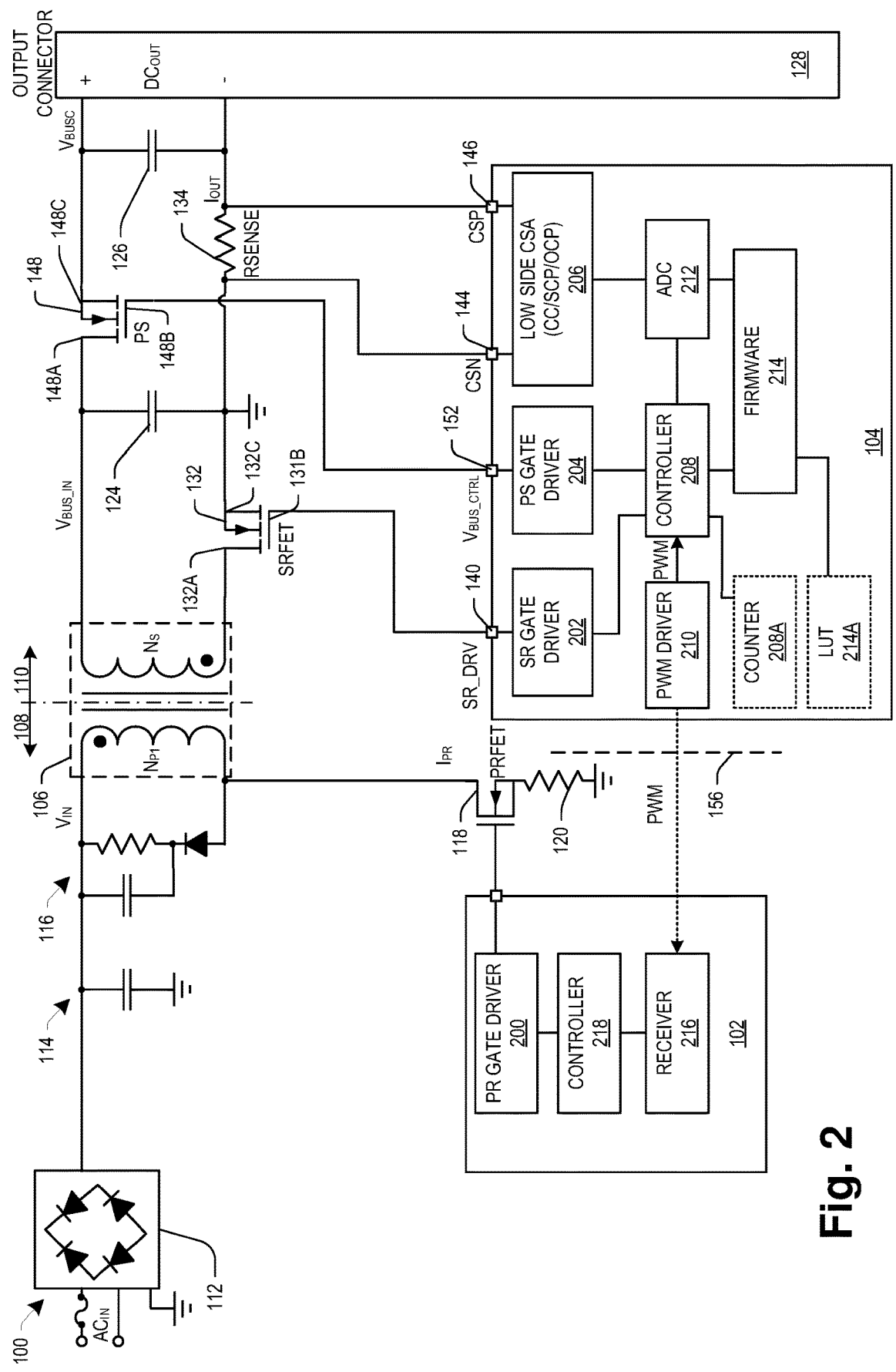
FIG. 2 is a schematic diagrams of a power converter configured for current sense fault detection, according to some embodiments.

FIG. 2 is a schematic diagrams of the power converter 100 configured for RSENSE short detection, according to some embodiments. For ease of illustration, portions of the power converter 100 are omitted or illustrated in simplified form in FIG. 2 compared to FIG. 1. The primary-side controller 102 on the primary side 108 of the power converter 100 controls the switching cycle of the flyback transformer 106 through a primary (PR) gate driver 200 based on control signals received from the secondary-side controller 104, such as PWM signals communicated using the pulse transformer 174. The secondary-side controller 104 on the secondary side 110 of the power converter 100 includes an SR gate driver 202 for controlling the SRFET 132 and a PS gate driver 204 for controlling the secondary switch 148, as well as other circuits (not shown) to control operation of the secondary side 110 and to provide signals (e.g., the PWM signals indicating transformer duty cycle) that control operation of the PR gate driver 200 in the primary-side controller 102. The PWM signals are illustrated in phantom to represent the isolation barrier 156.

In some embodiments, to detect a short on the RSENSE resistor 134, the secondary-side controller 104 includes a low-side current sense amplifier (CSA) 206 connected to the negative terminal of RSENSE resistor 134 through the CSN pin 144 and the positive terminal of the RSENSE resistor 134 through the CSP pin 146. The low-side CSA 206 senses the output current based on a voltage drop across the CSN pin 144 and the CSP pin 146. The low-side CSA 206 is configured to enable the secondary-side controller 104 to sense the current flow, $I_{OUT}$, from the power converter 100 to the output connector 128, and based on the output current to provide constant current (CC) regulation, short circuit protection (SCP), over current protection (OCP), and RSENSE short detection. The secondary-side controller 104 also includes a controller 208 configured to detect an RSENSE short condition. The controller 208 is connected to the PS gate driver 204, to a PWM driver 210, and to an analog-to-digital converter (ADC) 212, which is connected to the low-side CSA 206. The controller 208 and the ADC 212 are configured to operate under the control of firmware (FW) 214, based on programmable parameters stored in registers and/or memory of the secondary-side controller 104. The PWM driver 210 is configured to provide to the controller 208 the pulse width modulated (PWM) signal which indicates the duty cycle of the flyback transformer 106, and to send the PWM signal across the isolation barrier 156 to a receiver 216 in the primary-side controller 102. A controller 218 in the primary-side controller 102 controls the PR gate driver 200 based on the PWM signal.

The following example for RSENSE short detection is described for an implementation where the power converter 100 is operating in DCM. An RSENSE resistor 134 short condition, such as resistor defect, a printed circuit board manufacturing defect, and/or an operation-caused malfunction, would inhibit the secondary-side controller 104 from performing constant current (CC) regulation if the output current, $I_{OUT}$, exceeds the predefined limit (e.g., 8 A) and could potentially inhibit OCP/SCP even during a DC output fault (e.g., short-circuit) since the sensed current is inaccurate. This situation will cause the secondary-side controller 104 to continue operating in constant voltage (CV) mode and delivering the required output power on the DC output, albeit with an increase in the turn-on pulse width of the PWM control signal that is sent to the controller 218 to control the duty cycle of the flyback transformer 106.

In some embodiments, the controller 208 issues an RSENSE short detect interrupt responsive to the output of the low-side CSA 206 being reduced (e.g., lower than a first threshold) and the turn-on pulse of the PWM control signal being wider (e.g., greater than a second threshold). In some embodiments, the output current, $I_{OUT}$, flowing through the RSENSE resistor 134 is measured by the low-side CSA 206, the output current measurement is converted to a digital code by the ADC 212, and the digital code is compared to a pre-defined first threshold (which can be set by the firmware 214). Similarly, the PWM pulse width is measured using a counter 208A implemented by the controller 208, and the resulting PWM count is compared for higher than a pre-defined second threshold (which can also be set by the firmware 214). For example, the counter 208A may be triggered by a rising edge of the PWM signal and terminated by a falling edge of the PWM signal. In some embodiments, the first threshold (current) and the second threshold (PWM pulse width) may depend on one or more of the secondary side input voltage, $V_{BUS\_IN}$ generated by the flyback transformer 106 and the output voltage, $V_{BUSC}$, provided to the output connector 128. These values are known on the secondary side 110 by the secondary-side controller 104. When both conditions are met, e.g., the current through the RSENSE resistor 134 is lower than the first threshold and the pulse-width counter is higher than the second threshold, the controller 208 raises an interrupt to indicate an RSENSE-short fault. In some embodiments, the firmware 214 checks for the persistence of this interrupt multiple times (e.g., present for N-times sampled after intervals of M ms) before asserting an RSENSE short condition signal. Checking for the persistence of the RSENSE-short fault interrupt avoids a false RSENSE short condition assertion resulting from a dynamic current load change. In some embodiments, the firmware 214 and/or the controller 208 determines the PWM pulse-width threshold and the output current threshold dynamically based on the line-in voltage, $V_{BUS\_IN}$, and the output voltage, $V_{BUSC}$. In this manner, the RSENSE short detection self-adjusts dynamically during operation. In some embodiments, the PWM pulse-width threshold and/or the output current threshold are determined using a look-up table 214A in the firmware 214 indexed by $V_{BUS\_IN}$ and $V_{BUSC}$.

Figure 3:
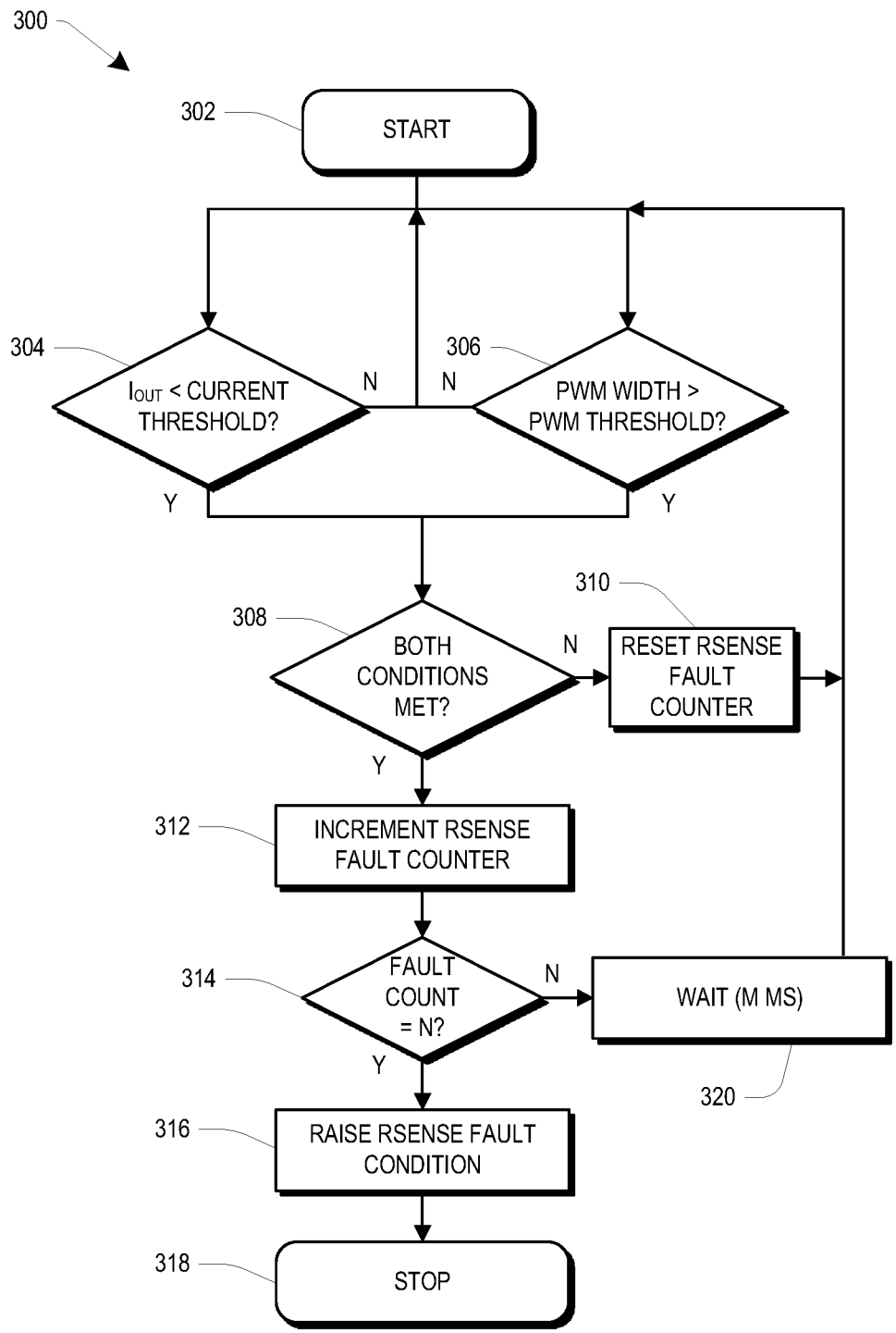
FIG. 3 is a flow diagram of a method for current sense fault detection, according to some embodiments.

FIG. 3 is a flow diagram of a method 300 for RSENSE short detection by a secondary-side controller 104 of a power converter 100, according to some embodiments. In some embodiments, the power converter 100 is an AC-DC converter operating in DCM. The method 300 starts at 302. At 304, the output current, $I_{OUT}$, is compared to a current threshold. At 306, the PWM width is compared to a PWM threshold, for example, by comparing the output of the counter 208A to a PWM count threshold. Other techniques may be used for determining the PWM pulse width. If either condition is not met at 304 or 306, a RSENSE fault counter is reset at 310 and the method 300 returns to start at 302. If the conditions of 304 and 306 are both met at 308, an RSENSE fault interrupt is raised and a RSENSE fault counter is incremented at 312. If the fault count meets a threshold, such as N, as 314, the RSENSE fault condition is raised at 316, such as by the firmware 214 and the method 300 stops at 318. If the fault count does not meet the threshold at 316, a wait interval, such as M ms, is implemented at 320 and the method 300 returns to 304 and 306 to determine if the RSENSE fault persists, which results in the RSENSE fault counter being incrementing at 312 is repeated as long as the condition at 308 persists until the fault count is met at 314.

In some embodiments, raising the RSENSE fault condition at 316 results in a protective action by the secondary-side controller 104. In some embodiments, the protective action includes an alert message provided on an indicator on the output connector 128. In some embodiments, the protection action comprises disabling the power converter 100, such as by opening the secondary provider switch 148, opening the SRFET 132, inhibiting the PWM signal to prevent closing of the PRFET 118, or some other protective action to disable the power converter 100.

In some embodiments, the method 300 is performed at least in part by processing logic that includes hardware (e.g., circuitry, dedicated logic, programmable logic, microcode, etc.), firmware, or a combination thereof. In one example embodiment, the method 300 is performed by processing logic (e.g., such as the controller 208) included in the secondary-side controller 104 of the power converter 100 illustrated in FIGS. 1 and 2. In some embodiments, the method 300 can be performed based on various parameters that can be programmable by the firmware 214. For example, firmware inputs can be used to define and/or set one or more of the current threshold used at 304 for the current measured across the RSENSE resistor 134, the PWM pulse-width threshold used at 306, the fault count (N) used at 314 for the count of RSENSE-short fault interrupts that need to be detected before an RSENSE short condition is asserted, and/or the wait time in ms (M) used at 320 for checking the persistence of the RSENSE-short fault interrupt, one or more of which can be dynamically changed during operation based on at least one of the input voltage ($V_{BUS\_IN}$) or the output voltage ($V_{BUSC}$).

The techniques for RSENSE short detection described herein provide at least the following advantages over existing conventional schemes:

Reliability/Safety: With the detection of RSENSE-short faults, the reliability of the power converter 100 increases by the limiting power at the output in case of any output-fault conditions resulting from failure of the RSENSE resistor 134;

BOM/Pin and Board Space Saving: No additional pins or external components are required to detect RSENSE-short faults, Flexibility/Programmability: The thresholds used to detect RSENSE-short faults can be programmed based on the AC input voltage, secondary side voltage ($V_{BUS\_IN}$ or $V_{BUSC}$) range to allow dynamic sensing, and Lower Die Cost: Chip manufacturers can re-use existing circuits and logic along with firmware to enable RSENSE short detection.

An exemplary embodiment may include a computer-readable medium (e.g., such as firmware, flash memory, or the like) storing instructions which, when executed by a device (e.g., such as controller 104 in FIGS. 1-2), are configured to perform at least part of the method described in FIG. 3. For example, one or more embodiments may comprise a non-transitory computer-readable medium storing a set of processor-executable instructions which, when executed by a semiconductor device controller comprising at least a processor (e.g., a CPU or another core processor) and memory, are configured to facilitate operations according to the techniques set forth herein. In some embodiments, the processor-executable instructions, when executed, are configured to facilitate performance of a method, such as at least some of the aforementioned method(s). In some embodiments, the processor-executable instructions, when executed, are configured to facilitate implementation of a system, such as at least some of the one or more aforementioned system(s). Many such computer-readable media may be devised by those of ordinary skill in the art that are configured to operate in accordance with the techniques presented herein.

Figure 4:
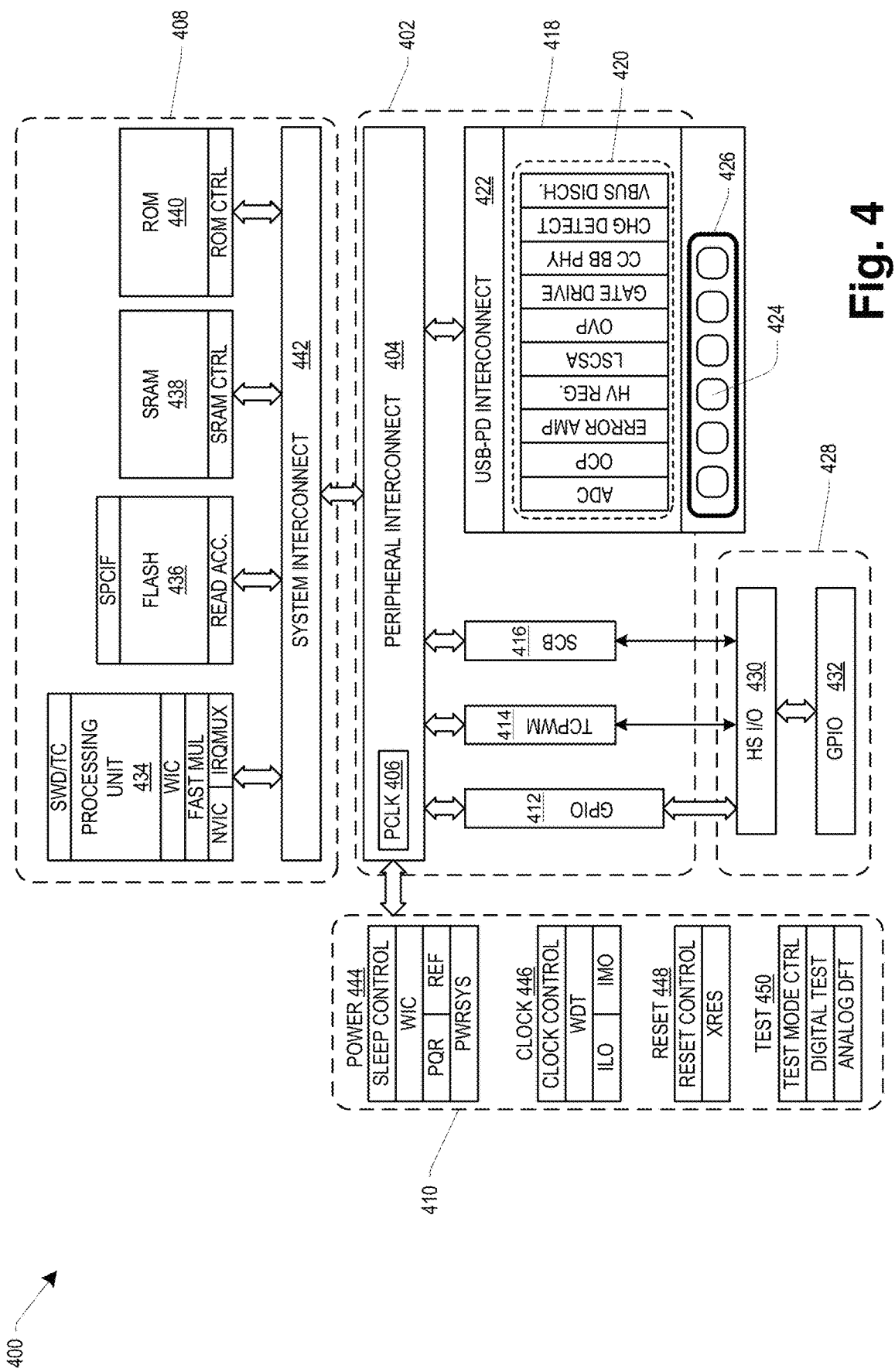
FIG. 4 illustrates an exemplary embodiment of a system for a USB device, in accordance with some embodiments.

FIG. 4 is a block diagram illustrating a system 400 for a USB device, in accordance with some embodiments. The system 400 may include a peripheral subsystem 402 that includes a number of components for use in the USB power delivery (USB-PD). The peripheral subsystem 402 may include a peripheral interconnect 404 including a peripheral clock module (PCLK) 406 for providing clock signals to the various components of the peripheral subsystem 402. The peripheral interconnect 404 may be a peripheral bus, such as a single level or Multi-level Advanced High Performance Bus (AHB), and can provide a data and control interface between the peripheral subsystem 402, a CPU subsystem 408, and system resources 410. The peripheral interconnect 404 may include controller circuitry, such as direct memory access (DMA) controllers, which may be programmed to transfer data between peripheral blocks without input from the CPU subsystem 408, without control of the CPU subsystem 408, or without stressing the same transfer.

The peripheral interconnect 404 may be used to couple the peripheral subsystem 402 components to other components of the system 400. A number of general purpose inputs/outputs (GPIOs) 412 may be coupled to the peripheral interconnect 404 for sending and receiving signals. The GPIOs 412 may include circuitry configured to implement various functions such as pull-up, pull-down, input threshold selection, input and output buffer enable/disable, single multiplexing, and so on. Other functions can also be implemented by the GPIOs 412. One or more timer/counter/pulse width modulators (TCPWM) 414 may also be coupled to the peripheral interconnect and may include circuitry to implement timing circuits (timers), counters, pulse width modulators (PWMs), decoders, and other digital functions associated with I/O signals work and can provide digital signals for system components of the system 400. The peripheral subsystem 402 may also include one or more Serial Communication Blocks (SCBs) 416 for implementing serial communication interfaces such as I2C, Serial Peripheral Interface (SPI), Universal Asynchronous Receiver/Transmitter (UART), Controller Area Network (CAN), CXPI (Clock Extension Peripheral Interface), etc.

For USB power delivery applications, the peripheral subsystem 402 may include a USB power delivery subsystem 418 coupled to the peripheral interconnect 404 and including a set of USB PD modules 420 for use with the USB power delivery. The USB PD modules 420 may be coupled to the peripheral interconnect 404 by a USB-PD interconnect 422. The USB PD modules 420 may include: an analog-to-digital converter (ADC) module for converting various analog signals into digital signals; an error amplifier (AMP) that regulates the output voltage on the VBUS line by PD contract; a high voltage (HV) regulator for converting the power source voltage to a precise voltage (such as 3.5-5V) to power the system 400; a low-side current sense amplifier (LSCSA) to accurately measure load current, an over-voltage protection (OVP) module and an over-current protection (OCP) module to provide over-current and over-voltage protection on the VBUS line with configurable thresholds and response times; one or more gate drivers for external power field effect transistors (FETs) used in USB power delivery in provider and consumer configurations; and a communications channel PHY (CC-BB-PHY) module to support communications on a Type-C communications channel (CC) line. The USB PD modules 420 may also include a charger detection module to determine if charging circuitry is present and coupled to the system 400 and a VBUS discharge module to control the discharge of voltage on the VBUS. The VBUS discharge module may be configured to couple to a power source node on the VBUS line or to an output (power sink) node on the VBUS line and adjust the voltage on the VBUS line to the desired voltage level (i.e., the voltage level specified in the PD—Contract negotiated voltage level). The USB power delivery subsystem 418 may also include pads 424 for external connections and Electrostatic Discharge (ESD) suppression circuitry 426 that may be required on a Type-C port. The USB PD modules 420 may also include a communication module for retrieving and transmitting information, such as control signals, such as from the secondary-side controller 104 to the primary-side controller 102.

The GPIOs 412, the TCPWM 414, and the SCB 416 may be coupled to an input/output (I/O) subsystem 428, which may include a high-speed (HS) I/O matrix 430 connected to a number of GPIOs 432. The GPIOs 412, the TCPWM 414, and the SCB 416 may be coupled to the GPIOs 432 through the HS-I/O matrix 430.

The central processing unit (CPU) subsystem 408 is provided for processing instructions, storing program information and data. The CPU subsystem 408 may include one or more processing units 434 for executing instructions and reading from and writing to memory locations from a number of memories. The processing unit 434 may be a processor suitable for operation in an integrated circuit (IC) or system-on-chip (SOC) device. In some embodiments, the processing unit 434 may be optimized for low power operation with extensive clock gating. In this embodiment, different internal control circuits can be implemented for processing unit operation in different power states. For example, the processing unit 434 may include a single wire debug (SWD) module, a terminal count (TC) module, a wake-up interrupt controller (WIC) configured to wake up the processing unit from a sleep state, which may shut down power when the IC or SOC is in is in a sleep state, a fast multiplier, a nested vector interrupt controller (NVIC), and an interrupt multiplexer (IRQMUX). The CPU subsystem 408 may include one or more memories, including a flash memory 436, a static random access memory (SRAM) 438, and a read only memory (ROM) 440. The flash memory 436 may be non-volatile memory (NAND flash, NOR flash, etc.) configured to store data, programs, and/or other firmware instructions. The flash memory 436 may include system performance controller interface (SPCIF) registers and a read accelerator and, by being integrated into the CPU subsystem 408, improve access times. The SRAM 438 may be volatile memory configured to store data and firmware instructions accessible by the processing unit 434. The ROM 440 may be configured to store boot routines, configuration parameters, and other firmware parameters and settings that do not change during operation of the system 400. The SRAM 438 and the ROM 440 may have associated control circuitry. The processing unit 434 and the memory modules 436, 438, 440 may be coupled to a system interconnect 442 to route signals to and from the various components of the CPU subsystem 408 to other blocks or modules of the system 400. The system interconnect 442 can be implemented as a system bus, such as a single-level or multi-level AHB. The system interconnect 442 may be configured as an interface to couple the various components of the CPU subsystem 408 together. The system interconnect 442 may be coupled to the peripheral interconnect 404 to provide signal paths between the CPU subsystem 408 and components of the peripheral subsystem 402.

The system resources 410 may include a power module 444, a clock module 446, a reset module 448, and a test module 450. The power module 444 may include a sleep control module, a wake-up interrupt control (WIC) module, a power-on-reset (POR) module, a number of voltage references (REF), and a PWRSYS module. In some embodiments, the power module 444 may include circuitry that allows the system 400 to draw power from and/or provide power to external sources at different voltage and/or current levels and control operation in different power states, such as active, low power, or sleep. In various embodiments, more power states may be implemented as the system 400 throttles operation to achieve a desired power consumption or power output. For example, the secondary-side controller 104 can access secondary electrical parameters on the secondary side. The clock module 446 may include a clock control module, a watchdog timer (WDT), an internal low-speed oscillator (ILO), and an internal main oscillator (IMO). The reset module 448 may include a reset control module and an external reset module (XRES module). The test module 450 may include a module to control and enter a test mode, as well as test control modules for analog and digital functions (digital test and analog DFT).

The system 400 may be implemented in a monolithic (e.g., single) semiconductor die. In other embodiments, different parts or modules of the system 400 may be implemented on different semiconductor dies. For example, the memory modules 436, 438, 440 of the CPU subsystem 408 may be on-chip or off-chip. In still other embodiments, circuitry with separate dies can be packaged in a single "chip" or remain separate and arranged on a circuit board (or in a USB cable connector) as separate elements.

The system 400 can be implemented in a number of application contexts to provide USB PD functionality. In any application context, an electronic device (e.g., a USB-enabled device) may have an IC controller or SOC implementation embodied by the system 400 arranged and configured to perform operations according to the techniques described herein. In one embodiment, the system 400 may be arranged and configured in a personal computer (PC) power adapter for a laptop, notebook computer, and so on. In another embodiment, the system 400 may be housed in a power adapter (e.g., a wall charger) for a mobile electronic device (e.g. a smartphone, a tablet, etc.). In another embodiment, the system 400 may be placed and configured in a wall outlet configured to provide power via USB Type-A and/or Type-C port(s). In another embodiment, the system 400 may be arranged and configured in a car charger configured to provide power via USB Type-A and/or Type-C port(s). In yet another embodiment, the system 400 may be arranged and configured in a power bank that can be charged via a USB Type-A and/or Type-C port and then provide power to another electronic device. In other embodiments, a system such as the system 400, may be configured with the power switch gate control circuitry described herein and may be incorporated into various other USB-enabled electronic or electromechanical devices.

It should be understood that a system, such as the system 400, implemented on or as an IC controller, can be placed in various applications that vary in terms of the type of power source used and the direction in which power is supplied. For example, in the case of a car charger, the power source is a car battery that provides DC power, while in the case of a mobile power adapter, the power source is an AC wall outlet. Further, in the case of a PC power adapter, the flow of power input is from a provider device to a consumer device, while in the case of a power bank, the flow of power input can be in either direction, depending on whether the power bank is operating as a power provider (e.g., to power another device) or as a power consumer (e.g., to allow itself to be charged). For these reasons, the various applications of the system 400 should be considered in an illustrative rather than a limiting sense.

In an embodiment of the techniques presented herein, a secondary-side controller for a Universal Serial Bus Power Delivery (USB-PD) power converter comprises a driver configured to control a power-switch on a primary side of the USB-PD power converter based on a pulse width modulated (PWM) signal, a current sense amplifier configured to generate an output current signal corresponding to an output current provided by the power converter across an external sense resistor, and a controller configured to identify a fault condition based on the PWM signal and the output current signal.

In an embodiment of the techniques presented herein, the secondary-side controller comprises an analog-to-digital converter coupled to the current sense amplifier to generate a current code representative of the output current signal, wherein the controller is configured to identify the fault condition based on the PWM signal and the current code.

In an embodiment of the techniques presented herein, the secondary-side controller comprises a pulse width counter configured to generate a PWM count corresponding to a pulse width of the PWM signal, wherein the controller is configured to identify the fault condition based on the PWM count and the output current signal.

In an embodiment of the techniques presented herein, the controller is configured to identify the fault condition responsive to the PWM count exceeding a first threshold and the output current signal being less than a second threshold.

In an embodiment of the techniques presented herein, the secondary-side controller comprises a look-up table configured to store first values of the first threshold and second values of the second threshold, wherein at least one of the first values or the second values are selected based on at least one of an output voltage of the USB-PD power converter or a line-in input voltage of the USB-PD power converter.

In an embodiment of the techniques presented herein, the secondary-side controller comprises a first current sense terminal coupled to the current sense amplifier, and a second current sense terminal coupled to the current sense amplifier, wherein the current sense amplifier senses a voltage drop across the first current sense terminal and the second current sense terminal to generate the output current signal.

In an embodiment of the techniques presented herein, the controller is configured to disable the power converter responsive to identifying the fault condition.

In an embodiment of the techniques presented herein, the controller is configured to disable the power converter responsive to determining that the fault condition persists for a predetermined time interval.

In an embodiment of the techniques presented herein, a Universal Serial Bus Power Delivery (USB-PD) system comprises a transformer including a primary side coupled to receive a rectified alternating current (AC) input voltage, and a secondary side connected to an output port to provide a direct current (DC) output voltage thereto, a primary-side controller coupled to a power switch to control operation of the transformer, a sense resistor coupled between the secondary side of the transformer and the output port, and a secondary-side controller coupled to the output port, the secondary-side controller including a driver configured to provide a pulse width modulated (PWM) signal to cause the primary-side controller to turn on and off the power switch, an analog-to-digital converter connected to receive an output current signal and generate an output current code based on the output current signal, wherein the output current signal corresponds to an output current across the sense resistor, and a controller configured to identify a fault condition based on the PWM signal and the output current code.

In an embodiment of the techniques presented herein, the USB-PD system comprises a current sense amplifier connected across the sense resistor and configured to generate the output current signal.

In an embodiment of the techniques presented herein, the secondary-side controller comprises a pulse width counter configured to generate a PWM count corresponding to a pulse width of the PWM signal, and the controller is configured to identify the fault condition based on the PWM count and the output current code.

In an embodiment of the techniques presented herein, the controller is configured to identify the fault condition based on the PWM count exceeding a first threshold and the output current code being less than a second threshold.

In an embodiment of the techniques presented herein, the secondary-side controller comprises a look-up table configured to store first values of the first threshold and second values of the second threshold, wherein at least one of the first values or the second values are selected based on at least one of the output voltage or the rectified AC input voltage.

In an embodiment of the techniques presented herein, the controller is configured to disable operation of the transformer responsive to identifying the fault condition.

In an embodiment of the techniques presented herein, the controller is configured to disable operation of the transformer responsive to determining that the fault condition persists for a predetermined time interval.

In an embodiment of the techniques presented herein, the output port comprises a USB Type C (USB-C) compatible connector.

In an embodiment of the techniques presented herein, a method of operating a Universal Serial Bus Power Delivery (USB-PD) power converter comprises generating a pulse width modulated (PWM) signal for controlling the power converter, determining an output current signal for the power converter, wherein the output current signal corresponds to an output current across an external sense resistor coupled in an output path of the USB-PD power converter, identifying a fault condition based on the PWM signal and the output current signal, and disabling operation of the power converter responsive to identifying the fault condition.

In an embodiment of the techniques presented herein, the method comprises generating a current code representative of the output current signal, and generating a PWM count corresponding to a pulse width of the PWM signal, wherein identifying the fault condition comprises identifying the fault condition responsive to the PWM count exceeding a first threshold and the output current signal being less than a second threshold.

In an embodiment of the techniques presented herein, the method comprises modifying at least one of the first threshold or the second threshold based on a change in an output voltage of the USB-PD power converter.

In an embodiment of the techniques presented herein, determining the output current signal for the USB-PD power converter comprises sensing a voltage drop across a first current sense terminal and a second current sense terminal connected in the output path of the USB-PD power converter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A secondary-side controller for a Universal Serial Bus Power Delivery (USB-PD) power converter, the secondary-side controller comprising:

a driver configured to control a power-switch on a primary side of the USB-PD power converter based on a pulse width modulated (PWM) signal;
a current sense amplifier configured to generate an output current signal corresponding to an output current provided by the USB-PD power converter across an external sense resistor; and
a controller configured to:
dynamically generate a PWM threshold based on at least one of a secondary-side line input voltage or a secondary-side output voltage; and
identify a fault condition based on the PWM signal violating the PWM threshold and based on the output current signal.

2. The secondary-side controller of claim 1, comprising:
an analog-to-digital converter coupled to the current sense amplifier to generate a current code representative of the output current signal, wherein:
the controller is configured to identify the fault condition based on the PWM signal and the current code.

3. The secondary-side controller of claim 1, comprising:
a pulse width counter configured to generate a PWM count corresponding to a pulse width of the PWM signal, wherein:
the controller is configured to identify the fault condition based on the PWM count violating the PWM threshold and based on the output current signal.

4. The secondary-side controller of claim 3, wherein:
the controller is configured to:
dynamically generate a current threshold based on at least one of the secondary-side line input voltage or the secondary-side output voltage; and
identify the fault condition responsive to the PWM count violating the PWM threshold and the output current signal being less than the current threshold.

5. The secondary-side controller of claim 4, comprising:
a look-up table configured to store first values of the PWM threshold and second values of the current threshold, wherein at least one of the first values or the second values are selected based on at least one of the secondary-side line input voltage or the secondary-side output voltage.

6. The secondary-side controller of claim 1, comprising:
a first current sense terminal coupled to the current sense amplifier; and
a second current sense terminal coupled to the current sense amplifier, wherein:
the current sense amplifier senses a voltage drop across the first current sense terminal and the second current sense terminal to generate the output current signal.

7. The secondary-side controller of claim 1, wherein:
the controller is configured to disable the USB-PD power converter responsive to identifying the fault condition.

8. The secondary-side controller of claim 1, wherein:
the controller is configured to disable the USB-PD power converter responsive to determining that the fault condition persists for a predetermined time interval.

9. A Universal Serial Bus Power Delivery (USB-PD) system comprising:
a transformer including a primary side coupled to receive a rectified alternating current (AC) input voltage, and a secondary side connected to an output port to provide a direct current (DC) output voltage thereto;
a primary-side controller coupled to a power switch to control operation of the transformer;
a sense resistor coupled between the secondary side of the transformer and the output port; and a secondary-side controller coupled to the output port, the secondary-side controller including:
a driver configured to provide a pulse width modulated (PWM) signal to cause the primary-side controller to turn on and off the power switch;
an analog-to-digital converter connected to receive an output current signal and generate an output current code based on the output current signal, wherein the output current signal corresponds to an output current across the sense resistor; and
a controller configured to:
dynamically generate a PWM threshold based on at least one of a secondary-side line input voltage or a secondary-side output voltage; and
identify a fault condition based on the PWM signal violating the PWM threshold and based on the output current code.

10. The USB-PD system of claim 9, comprising:
a current sense amplifier connected across the sense resistor and configured to generate the output current signal.

11. The USB-PD system of claim 9, wherein:
the secondary-side controller comprises a pulse width counter configured to generate a PWM count corresponding to a pulse width of the PWM signal, and
the controller is configured to identify the fault condition based on the PWM count violating the PWM threshold and based on the output current code.

12. The USB-PD system of claim 11, wherein:
the controller is configured to:
dynamically generate a current threshold based on at least one of the secondary-side line input voltage or the secondary-side output voltage; and
identify the fault condition based on the PWM count violating the PWM threshold and the output current code being less than the current threshold.

13. The USB-PD system of claim 12, wherein:
the secondary-side controller comprises:
a look-up table configured to store first values of the PWM threshold and second values of the current threshold, wherein at least one of the first values or the second values are selected based on the secondary-side line input voltage or the secondary-side output voltage.

14. The USB-PD system of claim 9, wherein:
the controller is configured to disable operation of the transformer responsive to identifying the fault condition.

15. The USB-PD system of claim 9, wherein:
the controller is configured to disable operation of the transformer responsive to determining that the fault condition persists for a predetermined time interval.

16. The USB-PD system of claim 9, wherein the output port comprises a USB Type C (USB-C) compatible connector.

17. A method of operating a Universal Serial Bus Power Delivery (USB-PD) power converter comprising:
generating a pulse width modulated (PWM) signal for controlling the USB-PD power converter;
determining an output current signal for the USB-PD power converter, wherein the output current signal corresponds to an output current across an external sense resistor coupled in an output path of the USB-PD power converter;
dynamically generating a PWM threshold based on at least one of a secondary-side line input voltage or a secondary-side output voltage;

identifying a fault condition based on the PWM signal violating the PWM threshold and based on the output current signal; and disabling operation of the USB-PD power converter responsive to identifying the fault condition.

18. The method of claim 17, comprising:

generating a PWM count corresponding to a pulse width of the PWM signal, wherein:

identifying the fault condition comprises identifying the fault condition responsive to the PWM count violating the PWM threshold and the output current signal being less than a current threshold.

19. The method of claim 18, comprising:

dynamically determining the current threshold based on at least one of the secondary-side line input voltage or the secondary-side output voltage.

20. The method of claim 17, wherein:

determining the output current signal for the USB-PD power converter comprises sensing a voltage drop across a first current sense terminal and a second current sense terminal connected in the output path of the USB-PD power converter.

* * * * *